United States Patent
Sato et al.

(10) Patent No.: US 12,379,020 B2
(45) Date of Patent: Aug. 5, 2025

(54) ELECTRIC ACTUATOR

(71) Applicant: NTN CORPORATION, Osaka (JP)

(72) Inventors: Koji Sato, Shizuoka (JP); Shinsuke Hirano, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 18/692,476

(22) PCT Filed: Sep. 2, 2022

(86) PCT No.: PCT/JP2022/033068
§ 371 (c)(1),
(2) Date: Mar. 15, 2024

(87) PCT Pub. No.: WO2023/047916
PCT Pub. Date: Mar. 30, 2023

(65) Prior Publication Data
US 2024/0426369 A1    Dec. 26, 2024

(30) Foreign Application Priority Data

Sep. 24, 2021 (JP) .................................. 2021-155555

(51) Int. Cl.
*F16H 25/22* (2006.01)
*H02K 7/06* (2006.01)
*F16H 25/20* (2006.01)

(52) U.S. Cl.
CPC .............. *F16H 25/22* (2013.01); *H02K 7/06* (2013.01); *F16H 2025/2081* (2013.01)

(58) Field of Classification Search
CPC ................................... F16H 57/02; H02K 5/08
See application file for complete search history.

(56) References Cited

U.S. PATENT DOCUMENTS

| 2019/0093750 A1 | 3/2019 | Matsuto et al. |
| 2021/0265892 A1 | 8/2021 | Shimizu et al. |

FOREIGN PATENT DOCUMENTS

| JP | 31-13284 | 8/1956 |
| JP | 47-21998 | 7/1972 |
| JP | 58-139877 | 9/1983 |
| JP | 2001-52526 | 2/2001 |
| JP | 2005-333800 | 12/2005 |
| JP | 2020-5453 | 1/2020 |
| JP | 2020005453 A * | 1/2020 ............. F16H 57/02 |
| JP | 6679380 | 4/2020 |
| JP | 2020-139540 | 9/2020 |

OTHER PUBLICATIONS

Machine translation of JP-2020005453-A (Year: 2020).*
International Search Report (ISR) issued Nov. 8, 2022 in International (PCT) Application No. PCT/JP2022/033068.

* cited by examiner

*Primary Examiner* — Randell J Krug
(74) *Attorney, Agent, or Firm* — Wenderoth, Lind & Ponack, L.L.P.

(57) ABSTRACT

A casing 10 that accommodates an electric motor 2 and a ball screw 30 as a motion conversion mechanism 3 includes a first case 11 that is made of an aluminum alloy and accommodates the electric motor 2 and a second case 12 that is coupled to the first case 11 in an axial direction in a state of accommodating the ball screw 30. The electric motor 2 is supported by the second case 12 via a metal bracket 8 and a screw 9, and the entire outer surface of at least one of the metal bracket 8 and the second case 12 is covered with an insulating film C.

4 Claims, 4 Drawing Sheets

ELECTRIC ACTUATOR

TECHNICAL FIELD

The present invention relates to an electric actuator.

BACKGROUND ART

For example, in a system in which operations of the automatic transmission, brakes, steering, and the like of an automobile are performed by the force of an electric motor, an electric actuator is widely adopted, the electric actuator including an electric motor, a motion conversion mechanism that converts rotational motion of the electric motor into linear motion and outputs the linear motion, and a casing that accommodates them, in which the motion conversion mechanism includes a screw mechanism having a screw shaft and a nut rotatably fitted to an outer periphery of the screw shaft.

Patent Literature 1 below describes an electric actuator in which a casing is subdivided in order to cope with multi-product development. For example, in the electric actuator illustrated in FIG. 12 of Patent Literature 1, a casing is formed by separably connecting a motor case accommodating an electric motor, a bearing case accommodating (a bearing rotatably supporting) a nut which is a rotation side of a screw mechanism, a shaft case accommodating a screw shaft which is a linear movement side of the screw mechanism, a gear case accommodating a rotation transmission mechanism (transmission gear mechanism) for transmitting rotation of the electric motor to the nut, and the like.

CITATION LIST

Patent Literature

Patent Literature 1: JP 6679380 B1

SUMMARY OF INVENTION

Technical Problems

As described in Patent Literature 1, in a case where the casing is configured by a coupling body of many subdivided cases, there is a concern that the cost of the electric actuator is increased due to an increase in the number of components and the number of assembling steps, and there is also a concern that it is difficult to stably secure desired assembly accuracy and it is difficult to stably exhibit high operation accuracy.

Therefore, a main object of the present invention is to provide an electric actuator capable of stably exhibiting high operation accuracy at low cost.

Solutions to Problems

The present invention devised to achieve the object described above is an electric actuator including: an electric motor; a motion conversion mechanism that converts rotational motion of the electric motor into linear motion; and a casing that accommodates the electric motor and the motion conversion mechanism, the motion conversion mechanism including a nut that rotates in response to the rotational motion of the electric motor, and a screw shaft that moves forward and backward in an axial direction with rotation of the nut, characterized in that the casing includes a first case that is made of an aluminum alloy and accommodates the electric motor, and a second case that is made of an aluminum alloy and is coupled to the first case in an axial direction in a state of accommodating the nut and the screw shaft, the electric motor is supported by the second case via a metal bracket, and an entire surface of at least one of the second case and the metal bracket is covered with an insulating film.

According to the above configuration, by coupling the first case and the second case in the axial direction, it is possible to form the casing that accommodates the electric motor and (a screw mechanism as) the motion conversion mechanism. Since the second case accommodates the nut and the screw shaft, the second case integrally has portions corresponding to the "bearing case" and the "shaft case" of the conventional product described in Patent Literature 1. Therefore, the number of components and the number of assembling steps of the casing can be reduced, and the cost of the electric actuator can be reduced.

A metal fastening member typified by a screw is typically used for coupling between the cases in consideration of securing of coupling strength and ease of assembly and disassembly. However, for example, in a case where both the cases are made of resin for the purpose of weight reduction of the electric actuator, it is difficult for the case itself (resin portion) to receive a fastening force of the screw necessary for securing the coupling strength. Therefore, it is necessary to perform insert molding or the like of a metal screw receiving component in the resin portion, which leads to an increase in cost. In this respect, in the present invention, since the first case and the second case are formed of an aluminum alloy, the first case and the second case can be firmly coupled using a fastening member such as a screw without requiring a separate screw receiving component. The first and second cases made of an aluminum alloy can be molded products (die-cast products). This makes it possible to stably obtain a casing having high dimensional accuracy and mechanical strength at low cost.

Furthermore, in the present invention, since the electric motor is supported by the second case that accommodates the nut and the screw shaft (motion conversion mechanism) via the metal bracket, the relative position between a rotating shaft and the rotation side (nut) of the motion conversion mechanism can be accurately managed, and the operation accuracy of the screw shaft and eventually the electric actuator can be improved. However, if such a support structure is adopted, the electric motor and the second case can be conducted via the metal bracket, and thus there is a possibility that a drive current of the electric motor leaks to the casing. If the drive current of the electric motor leaks to the casing, the current leaks to a mating component (for example, a component that accommodates and holds an object to be operated by the electric actuator) on which the casing is mounted, and there is a possibility that a malfunction such as an electrical failure is induced in the object to be operated by the electric actuator. Therefore, in the present invention, the entire surface of at least one of the second case and the metal bracket is covered with the insulating film. As a result, the possibility of causing the current leakage described above and the malfunction of the object to be operated caused by the current leakage can be effectively reduced, and complicated masking work can be omitted in forming the insulating film.

The film thickness of the insulating film formed on at least one of the second case and the metal bracket is preferably 5 µm or more. As a result, the possibility that the current leaks from the electric motor to the second case (casing) can be further reduced.

The present invention can be applied to the electric actuator in which the rotating shaft of the electric motor and the screw shaft of the motion conversion mechanism are arranged in parallel. In this case, the rotational motion of the electric motor can be transmitted to the nut via a power transmission mechanism also accommodated in the second case that accommodates the motion conversion mechanism.

The electric actuator according to the present invention needs to be provided with a rotation regulating portion that regulates rotation of the screw shaft constituting a linear movement side of the motion conversion mechanism. The rotation regulating portion can be constructed, for example, by fitting both end portions in the longitudinal direction of a detent pin mounted on the screw shaft into a pair of guide grooves provided in an accommodating portion for the screw shaft in the second case and extending in the axial direction. Guide collars each made of resin and having a bottomed cylindrical shape are preferably rotatably mounted on the both end portions in the longitudinal direction of the detent pin. As a result, when the screw shaft moves forward and backward in the axial direction, the detent pin can be smoothly guided and moved along the guide grooves of the second case, so that the operability of the screw shaft can be enhanced.

The guide grooves in the axial direction provided in the second case made of an aluminum alloy needs to be finished by machining using a cutting tool such as an end mill. In this case, the cross-sectional shape of the groove bottom surface of the guide groove is an arc shape matching the cross-sectional shape of the cutting tool. Therefore, the outer bottom surface of the guide collar fitted in the guide groove, the outer bottom surface being arranged to face the groove bottom surface of the guide groove is also formed in an arc shape. As a result, the guide collar can smoothly move along the guide groove, so that the screw shaft can smoothly move forward and backward.

Advantageous Effects of Invention

As described above, according to the present invention, it is possible to provide an electric actuator capable of stably exhibiting high operation accuracy at low cost.

DESCRIPTION OF EMBODIMENT

An embodiment of the present invention will be described below with reference to the drawings.

Figure 1:
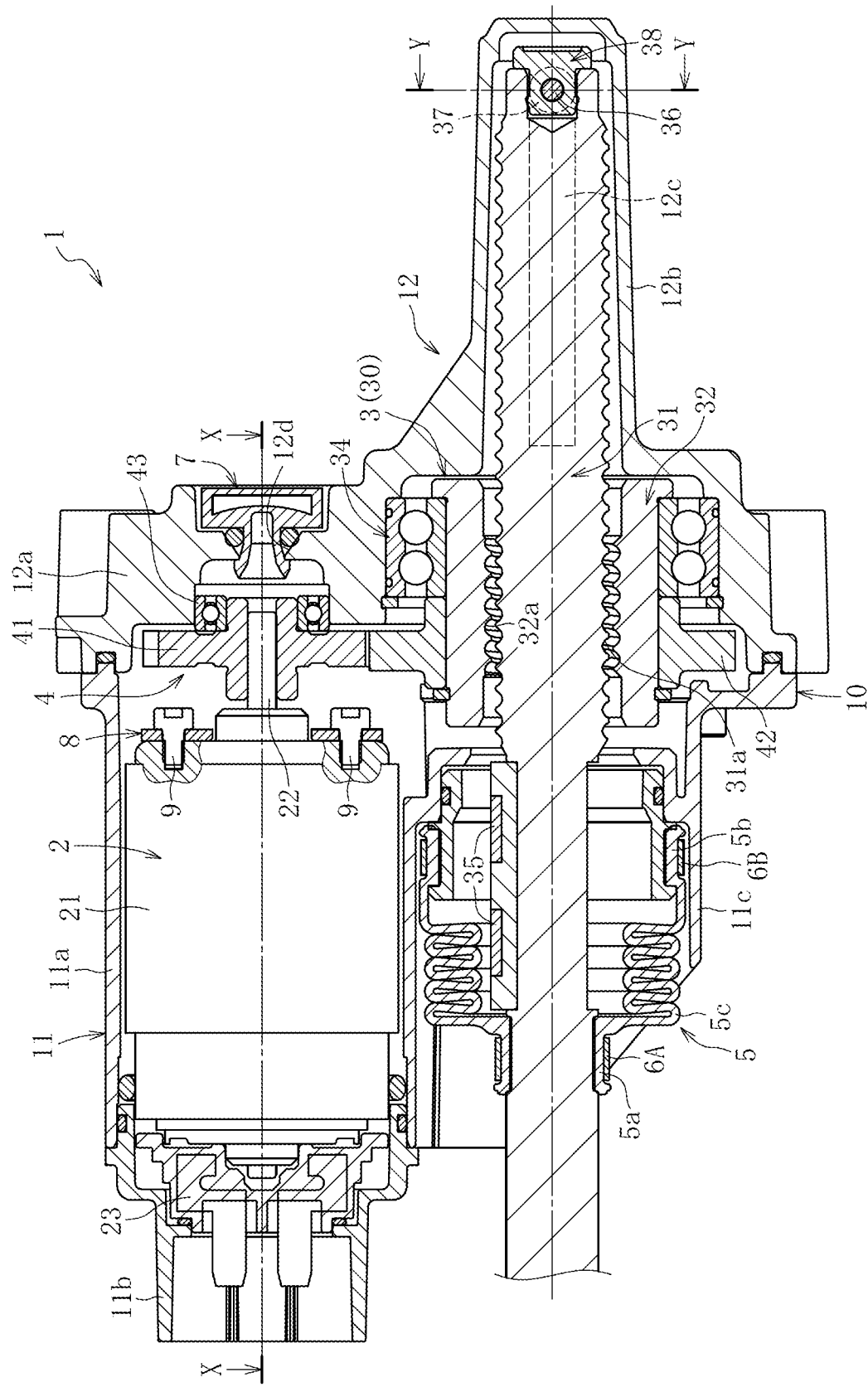
FIG. 1 is a schematic longitudinal sectional view of an electric actuator according to an embodiment of the present invention.
Figure 2:
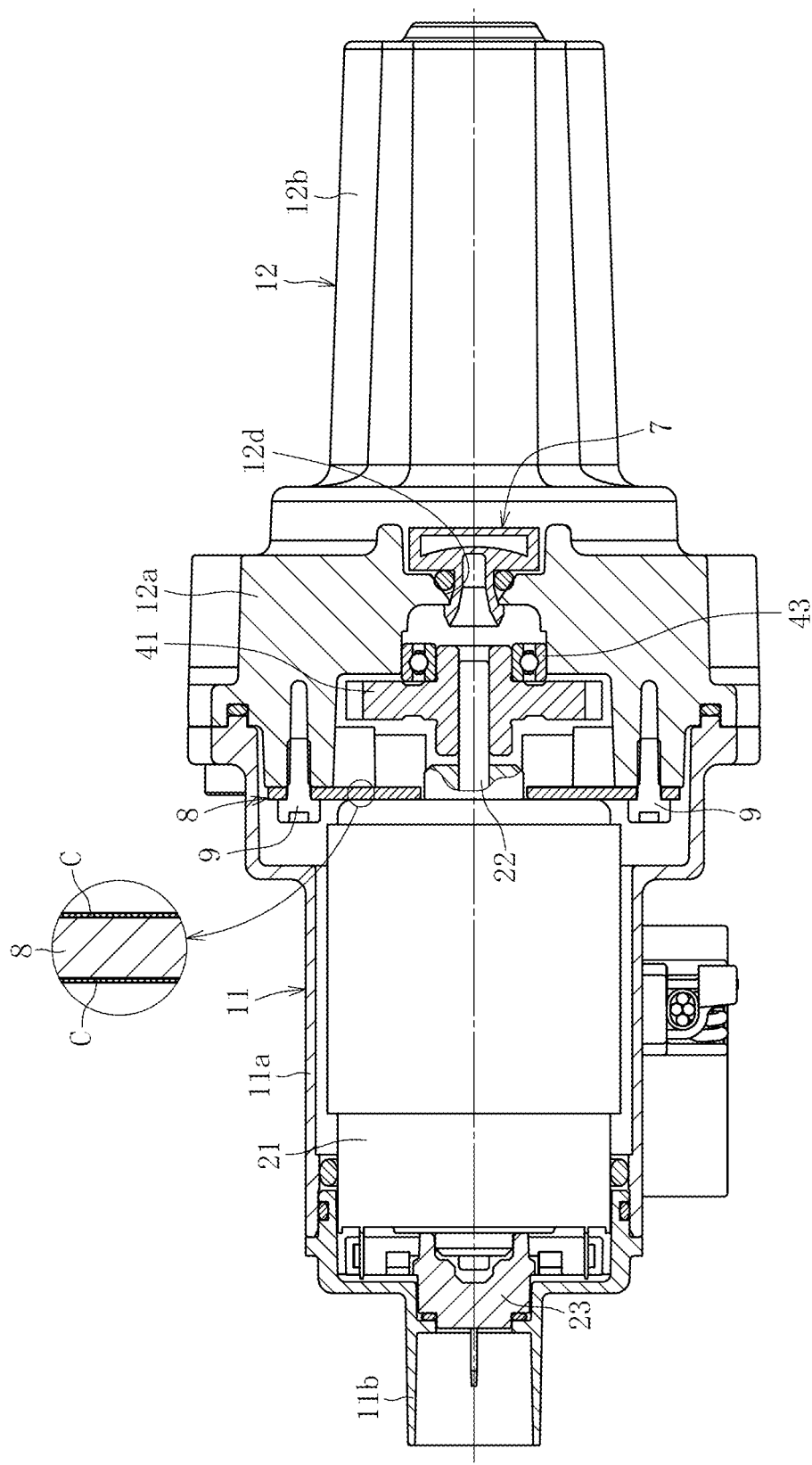
FIG. 2 is a cross-sectional view taken along line X-X in FIG. 1.
Figure 3:
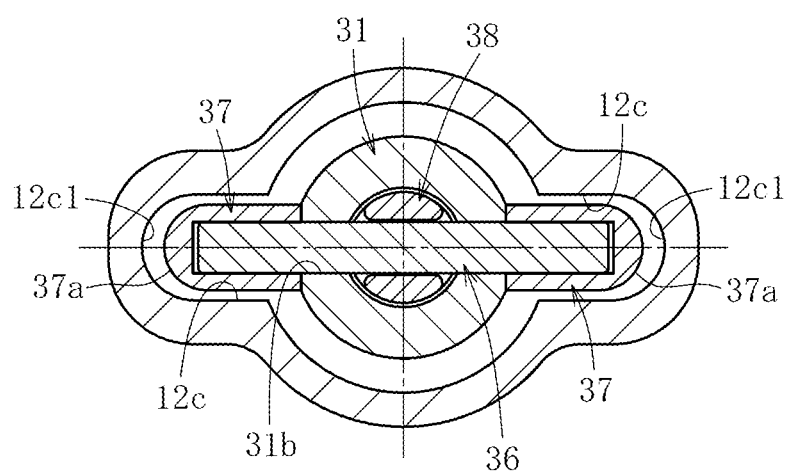
FIG. 3 is a cross-sectional view taken along line Y-Y in FIG. 1.
Figure 4:
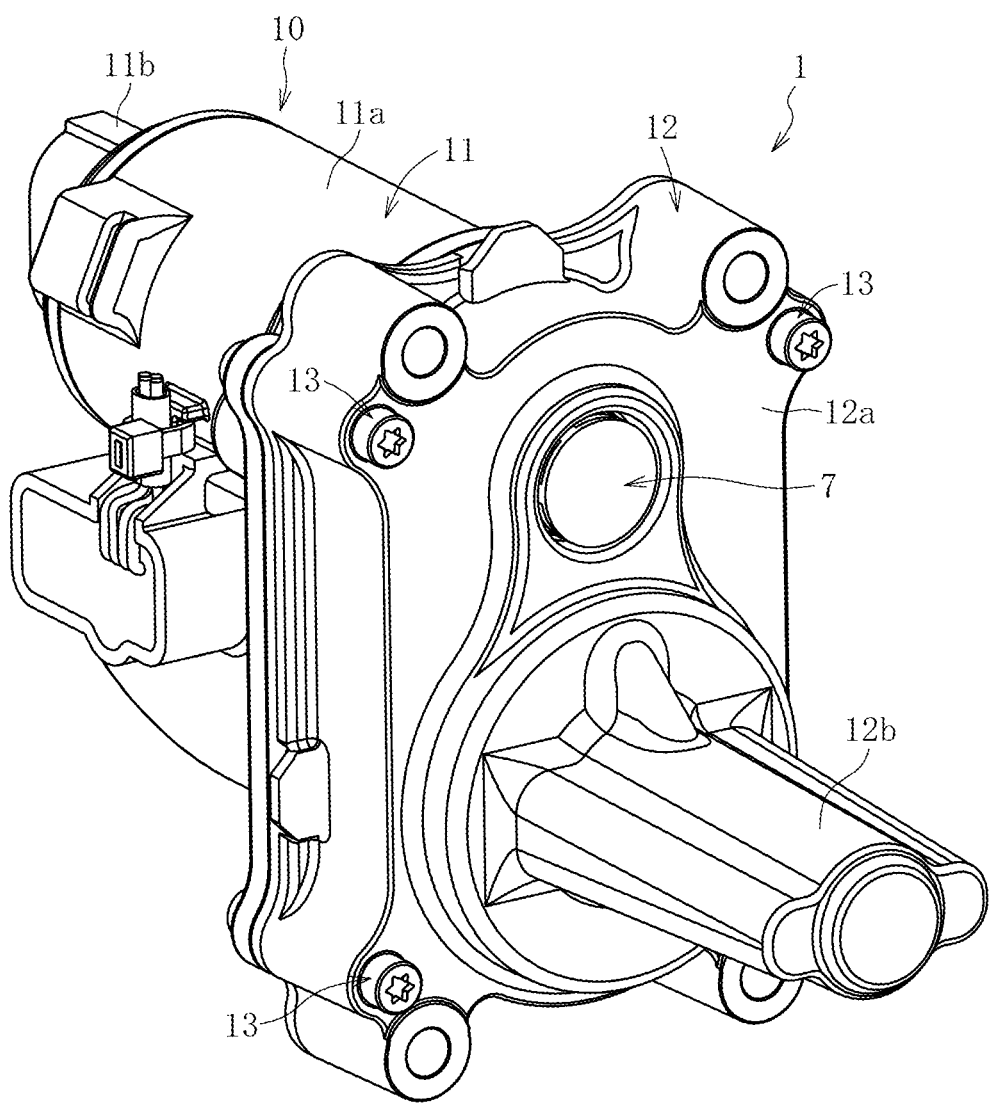
FIG. 4 is a schematic perspective view of the electric actuator illustrated in FIG. 1.

FIG. 1 illustrates a schematic longitudinal sectional view of an electric actuator 1 according to an embodiment of the present invention, FIG. 2 illustrates a schematic sectional view taken along line X-X in FIG. 1, FIG. 3 illustrates a schematic sectional view taken along line Y-Y in FIG. 1, and FIG. 4 is an overall perspective view of the electric actuator 1. The electric actuator 1 illustrated in FIG. 1 and the like includes an electric motor 2, a motion conversion mechanism 3 that converts rotational motion of the electric motor 2 into linear motion, a power transmission mechanism 4 that transmits rotational motion (driving force) of the electric motor 2 to the motion conversion mechanism 3, and a casing 10 that accommodates the electric motor 2, the motion conversion mechanism 3, and the power transmission mechanism 4. Note that the "axial direction" used in the following description is a direction along the axis of a rotating shaft 22 of the electric motor 2, and "one side in the axial direction" and "the other side in the axial direction" are a left side in the drawing of FIG. 1 (a forward movement side of a screw shaft 31) and a right side in the drawing of FIG. 1 (a backward movement side of the screw shaft 31), respectively.

The casing 10 includes a first case 11 that accommodates the electric motor 2 and a second case 12 that accommodates the motion conversion mechanism 3 and the power transmission mechanism 4. Both the cases 11, 12 are aluminum die-cast products (aluminum alloy molded products), and are coupled in the axial direction using screws 13 (see FIG. 4), which are metal fastening members.

The electric motor 2 includes a motor body 21 including a stator core and a stator coil, and the rotating shaft 22, and is electrically connected to a power supply, not illustrated, via a connector 23 disposed adjacent to the one side in the axial direction. As the electric motor 2, a motor capable of detecting and controlling the rotation amount (rotation angle) of the rotating shaft 22, for example, a three-phase brushless motor is used.

The electric motor 2 is accommodated in a motor accommodating portion 11a constituting the first case 11, and the connector 23 is accommodated in a connector accommodating portion 11b having a cylindrical shape and fixed to the motor accommodating portion 11a. That is, the first case 11 includes the motor accommodating portion 11a and the connector accommodating portion 11b. In the illustrated example, the connector accommodating portion 11b is fitted and fixed to the motor accommodating portion 11a; however, the connector accommodating portion 11b can be provided integrally with the motor accommodating portion 11a.

The motion conversion mechanism 3 includes a ball screw 30 including a screw shaft 31 arranged in parallel with the rotating shaft 22, a nut 32 rotatably fitted to the outer periphery of the screw shaft 31 via a large number of balls, not illustrated, and a deflector as a circulation member, not illustrated. Spiral grooves 31a and 32a are formed on the outer peripheral surface of the screw shaft 31 and the inner peripheral surface of the nut 32, respectively, and a large number of balls are loaded between the spiral grooves 31a and 32a, and the deflector is incorporated.

The screw shaft 31 has an operation unit for transmitting an output (linear motion) thereof to an object to be operated, not illustrated. Therefore, the screw shaft 31 also functions as an output shaft of the electric actuator 1. Although not illustrated, the operation unit is provided at an end portion (portion of the screw shaft 31 protruding to the outside of the casing 10) on the one side in the axial direction of the screw shaft 31.

The nut 32 is rotatably supported with respect to (the second case 12 of) the casing 10 by a rolling bearing (first rolling bearing) 34. The rolling bearing 34 in the illustrated example is a ball bearing including an outer ring attached to the inner peripheral surface of the second case 12, an inner ring attached to the outer peripheral surface of the nut 32, double-row balls rollably arranged between the outer ring and the inner ring, and a retainer, not illustrated, that holds the balls, and is a double-row angular contact ball bearing capable of supporting radial loads and axial loads in both directions.

The power transmission mechanism 4 transmits the rotational motion of the electric motor 2 to the nut 32 of the ball screw 30, and includes a gear mechanism including a drive gear 41 provided so as to be rotatable together with the rotating shaft 22, a driven gear 42 provided so as to be rotatable together with the nut 32 and meshed with the drive gear 41, and a rolling bearing (second rolling bearing) 43 that rotatably supports the drive gear 41 with respect to (the second case 12 constituting) the casing 10. The rolling bearing 43 in the illustrated example is a ball bearing (deep groove ball bearing) including an outer ring attached to the inner peripheral surface of the second case 12, an inner ring attached to the outer peripheral surface of the drive gear 41, balls rollably arranged between the outer ring and the inner ring, and a retainer, not illustrated, that holds the balls.

When the rotating shaft 22 rotates by the power transmission mechanism 4 having the above configuration, the drive gear 41 integrally rotates, and the driven gear 42 meshed with the drive gear 41 and the nut 32 of the ball screw 30 integrally rotate. As a result, the screw shaft 31 moves forward and backward in the axial direction according to the rotation direction of the nut 32 (rotating shaft 22). Note that in the present embodiment, the driven gear 42 having a larger diameter and a larger number of teeth than those of the drive gear 41 is adopted. Therefore, the rotational motion of the rotating shaft 22 input to the power transmission mechanism 4 is transmitted to the nut 32 after being decelerated and the torque is increased. As a result, the electric motor 2 can be downsized.

The ball screw 30 as the motion conversion mechanism 3 and the power transmission mechanism 4 are accommodated in the second case 12 of the casing 10. The second case 12 integrally includes a first accommodating portion 12a that accommodates the nut 32 of the ball screw 30, the rolling bearing 34 that rotatably supports the nut 32, the power transmission mechanism 4, and the like, and a second accommodating portion 12b that has a bottomed cylindrical shape and accommodates part of the screw shaft 31.

The electric actuator 1 of the present embodiment includes a position detection device for detecting the axial position (forward/backward movement amount) of the screw shaft 31. This position detection device includes, for example, a magnetic sensor (not illustrated) as a stroke sensor held on the inner periphery of (a boot mounting portion 11c of) the first case 11, and a permanent magnet 35 as a sensor target mounted on the screw shaft 31. In this case, when the screw shaft 31 moves forward and backward, the magnetic sensor detects a change in the magnetic field (for example, the direction and strength of the magnetic flux density) of the permanent magnet 35 that moves along with the forward and backward movement, thereby detecting the amount of forward and backward movement of the screw shaft 31.

The electric actuator 1 includes a rotation regulating portion for regulating rotation of the screw shaft 31 about the axis thereof. As illustrated in an enlarged view in FIG. 3, the rotation regulating portion of the present embodiment includes: one detent pin 36 that is inserted (press-fitted) into a through hole 31b in a radial direction provided at the end portion on the other side in the axial direction of the screw shaft 31 and has both end portions in the longitudinal direction protruding radially outward of the screw shaft 31, a pair of guide collars 37 rotatably fitted to the protruding portions of the detent pin 36, and a pair of guide grooves 12c which is provided in the inner peripheral surface of the second accommodating portion 12b of the second case 12 and extends in the axial direction and in which the guide collars 37 are rollably fitted. By providing such a rotation regulating portion, when the nut 32 rotates, the screw shaft 31 moves forward to the one side in the axial direction or moves backward to the other side in the axial direction according to the rotation direction of the nut 32 without rotating about the axis thereof, and operates the object to be operated.

Incidentally, since the pair of guide grooves 12c provided in the inner periphery of the second case 12, which is an aluminum die-cast product, is long in the axial direction, it is difficult to mold the pair of guide grooves 12c with high accuracy. Therefore, when the pair of guide grooves 12c is provided in the second case 12, at least finish processing is performed by machining using a cutting tool such as an end mill having a circular cross-sectional shape. As a result, the cross-sectional shape of the groove bottom surface 12c1 of each guide groove 12c becomes an arc shape following the cross-sectional shape of the cutting tool as illustrated in FIG. 3. At this time, if the cross-sectional shapes of the groove bottom surface 12c1 of the guide groove 12c and the outer bottom surface 37a of the guide collar 37 that has a bottomed cylindrical shape, the outer bottom surface 37a facing the groove bottom surface 12c1, are different from each other, it may be difficult to smoothly guide and move the guide collar 37 along the guide groove 12c, more specifically, to smoothly move the screw shaft 31 forward and backward. Therefore, the outer bottom surface 37a of the guide collar 37 is formed in an arc shape similar to the shape of the groove bottom surface 12c1 of the guide groove 12c, more specifically, in an arc shape concentric with the groove bottom surface 12c1.

A buffer member 38 formed of an elastic material such as rubber, resin, or thermoplastic elastomer is mounted on the end portion on the other side in the axial direction of the screw shaft 31. As a result, for example, even in a case where the screw shaft 31 malfunctions due to a failure or the like of the position detection device and the screw shaft 31 collides with the bottom portion of the second accommodating portion 12b of the second case 12, the shock load is alleviated by the buffer member 38, so that the possibility that the second case 12 is damaged or the like can be reduced. The buffer member 38 is provided with a through hole 38a in the radial direction, and the buffer member 38 is mounted on and fixed to the screw shaft 31 by inserting the detent pin 36 into the through hole 38a. In short, the detent pin 36 functions not only as a shaft for supporting the guide collars 37 but also as a member for holding the buffer member 38.

Since the screw shaft 31 moves forward and backward in the axial direction in a state where the end portion thereof on the one side in the axial direction always protrudes to the outside of the casing 10, an annular gap is provided between the outer peripheral surface of the screw shaft 31 and the opening of the casing 10. Since a lubricant for smoothly operating the motion conversion mechanism 3 (ball screw 30) and the power transmission mechanism 4 is interposed in the internal space of the casing 10, it is necessary to seal the annular gap to prevent intrusion of foreign matter such as water and dust into the casing 10 through the annular gap and leakage of the lubricant to the outside. In the present embodiment, the boot mounting portion 11c having a cylindrical shape is provided on the first case 11 constituting the casing 10, and a boot 5 having a cylindrical shape and functioning as a sealing member is mounted between the boot mounting portion 11c and the screw shaft 31. In the illustrated example, the boot mounting portion 11c provided separately from the motor accommodating portion 11a is fitted and fixed to the motor accommodating portion 11a; however, the boot mounting portion 11c may be provided integrally with the motor accommodating portion 11a.

The boot 5 is formed of an elastic material such as resin, rubber, or thermoplastic elastomer, and integrally includes a small-diameter cylindrical portion 5a and a large-diameter cylindrical portion 5b, and a bellows portion 5c connecting the cylindrical portions 5a and 5b. The small-diameter cylindrical portion 5a is fastened and fixed to the screw shaft 31 by a boot band 6A, and the large-diameter cylindrical portion 6b is fastened and fixed to the boot mounting portion 11c by a boot band 6B. With such a configuration, when the screw shaft 31 moves forward and backward in the axial direction, the boot 5 expands and contracts in the axial direction.

The casing 10, including the boot 5, has a sealing structure for preventing foreign matter from entering the internal space and leakage of the lubricant to the outside. Therefore, if no measure is taken, the internal pressure of the casing 10 tends to increase as the screw shaft 31 moves backward to the other side in the axial direction (the boot 5 is compressed and deformed in the axial direction). When the internal pressure of the casing 10 is excessively increased, the boot 5 may be damaged or the like. Therefore, the electric actuator 1 of the present embodiment is provided with a ventilation filter 7 for moving air in and out of the casing 10. The ventilation filter 7 has a function of preventing the flow of liquid such as water and solid such as dust and the like and allowing the flow of gas such as air, and is fixed to a hole 12d formed coaxially with the rotating shaft 22 in the second case 12 of the casing 10. By providing such a ventilation filter 7, the internal pressure of the casing 10 can be maintained in an appropriate range.

Hereinafter, a characteristic configuration of the electric actuator 1 of the present embodiment will be described.

As described above, the casing 10 includes the first case 11 that is made of aluminum alloy and accommodates the electric motor 2, and the second case 12 that is made of aluminum alloy and is coupled to the first case 11 in the axial direction in a state of accommodating (the ball screw 30 as the motion conversion mechanism 3 including) the screw shaft 31 and the nut 32, and furthermore, the power transmission mechanism 4. In this case, the second case 12 integrally includes also a portion corresponding to the "transmission gear case" in addition to the "bearing case" and the "shaft case" of the conventional product described in Patent Literature 1. Therefore, the number of components and the number of assembling steps of the casing 10 can be reduced, and the cost of the electric actuator 1 can be reduced.

For coupling the first case 11 and the second case 12, the screws 13 (see FIG. 4) are used in consideration of securing coupling strength and ease of assembly and disassembly. Since both the first case 11 and the second case 12 coupled using the screws 13 are made of an aluminum alloy, the cases 11 and 12 can be firmly coupled without requiring separate screw receiving components or the like made of a metal material. Since both the cases 11 and 12 made of an aluminum alloy are die-cast products, the casing 10 having high dimensional accuracy and mechanical strength can be stably obtained at low cost.

The electric motor 2 is supported by the second case 12 via metal brackets 8. In the present embodiment, as illustrated in FIGS. 1 and 2, the electric motor 2 is fixedly supported with respect to the second case 12 by fixing the metal brackets 8 to the motor body 21 of the electric motor 2 and the first accommodating portion 12a of the second case 12 using screws 9. The second case 12 accommodates (rotatably supports via the second rolling bearing 34) the nut 32 constituting the rotation side of the motion conversion mechanism 3 (ball screw 30), and accommodates (rotatably supports via the first rolling bearing 43) the drive gear 41 of the power transmission mechanism 4 provided to be rotatable together with the rotating shaft 22. Therefore, it is possible to accurately manage the relative positional accuracy between the rotating shaft 22 and the nut 32 on the rotation side of the motion conversion mechanism 3 and the relative positional accuracy (coaxiality) between the rotating shaft 22 and the drive gear 41 of the power transmission mechanism 4, and it is possible to improve the operation accuracy of the screw shaft 31, and furthermore, the operation accuracy of an object to be operated.

If the motor support structure as described above is adopted, the electric motor 2 and the second case 12 made of aluminum alloy can be conducted via the metal brackets 8 and the screws 9. Therefore, if no measure is taken, the drive current of the electric motor 2 may leak to the casing 10 (second case 12). If the drive current of the electric motor 2 leaks to the casing 10, the current leaks to a mating component (for example, a component that accommodates and holds an object to be operated by the electric actuator 1) on which the casing 10 is mounted, and there is a possibility that a malfunction such as an electrical failure is induced in the object to be operated by the electric actuator 1.

Therefore, in the present embodiment, the entire surface of the metal bracket 8 including the inner wall surface of the insertion hole through which the screw 9 is inserted is covered with an insulating film C (see the enlarged view in FIG. 2). As a result, the conductive path formed between the electric motor 2 and the casing 10 (second case 12) is cut off, and the possibility that the drive current of the electric motor 2 leaks to the casing 10 can be effectively reduced. Note that the insulating film C may be formed only on part of the metal bracket 8 as long as the conductive path can be cut off. However, a masking forming operation and a masking removing operation are additionally required, which leads to an increase in cost. Therefore, the insulating film C is preferably formed so as to cover the entire surface of the metal bracket 8.

Although not illustrated, the insulating film C may be formed so as to cover the entire surface of the second case 12 instead of the metal brackets 8 or in addition to the metal brackets 8.

Note that as illustrated in FIG. 1, a seal ring made of an insulating material such as rubber is interposed in a compressed state between the end portion on the one side in the axial direction of the motor body 21 of the electric motor 2 and (the motor accommodating portion 11a constituting) the first case 11 of the casing 10. As a result, current leakage from the electric motor 2 to the first case 11 can be prevented as much as possible.

The insulating film C is selected from those having high withstand voltage, specifically those capable of exhibiting insulation performance without being damaged even when a high voltage of about 1000 V is applied. The thickness of the insulating film C is preferably 5 µm or more, and more preferably 10 µm or more from the viewpoint of stably exhibiting high insulation properties (withstand voltage). However, if the insulating film C becomes too thick, the amount of the film-forming material used increases, and the cost increases. Therefore, the thickness of the insulating film C is preferably 30 μm or less.

The electric actuator 1 according to the embodiment of the present invention is characterized by being able to be manufactured at a relatively low cost, being able to stably secure desired assembly accuracy and operation accuracy (operation accuracy of the output shaft), and being highly reliable in combination with the above-described operation effects.

Although the electric actuator 1 according to the embodiment of the present invention has been described above, the electric actuator 1 can be appropriately modified without departing from the gist of the present invention.

For example, although the motion conversion mechanism 3 is configured by the ball screw 30 in the embodiment described above, the present invention can also be applied to an electric actuator 1 in which a motion conversion mechanism 3 is configured by a sliding screw. The sliding screw herein is a screw mechanism that substantially includes only a screw shaft 31 and a nut 32 rotatably fitted to the outer periphery of the screw shaft 31 without a ball and a deflector.

The present invention can also be applied to, for example, an electric actuator I in which a speed reduction mechanism such as a planetary gear speed reducer is provided between an electric motor 2 and a power transmission mechanism 4. In addition, as the power transmission mechanism 4, it is also possible to adopt a mechanism not having a deceleration function, for example, a mechanism including a drive gear 41 and a driven gear 42 having the same diameter and the same number of teeth. Furthermore, the present invention can be applied to an electric actuator 1 in which a rotating shaft 22 and a screw shaft 31 are coaxially arranged.

The present invention is not limited to the above-described embodiment at all, and it is a matter of course that the present invention can be implemented in various forms without departing from the gist of the present invention. The scope of the present invention is defined by the claims, and further includes equivalent meanings described in the claims and all modifications within the scope.

REFERENCE SIGNS LIST

1 Electric actuator
2 Electric motor
3 Motion conversion mechanism
4 Power transmission mechanism
8 Metal bracket
9 Screw
10 Casing
11 First case
12 Second case
12c Guide groove
12c1 Groove bottom surface
22 Rotating shaft
30 Ball screw
31 Screw shaft
32 Nut.
34 Rolling bearing (first rolling bearing)
37 Guide collar
37a Outer bottom surface
41 Drive gear
42 Driven gear
43 Rolling bearing (second rolling bearing)
C Insulating film

The invention claimed is:

1. An electric actuator comprising:
an electric motor;
a motion conversion mechanism that converts rotational motion of the electric motor into linear motion; and
a casing that accommodates the electric motor and the motion conversion mechanism,
the motion conversion mechanism including a nut that rotates in response to the rotational motion of the electric motor, and a screw shaft that moves forward and backward in an axial direction with rotation of the nut,
characterized in that the casing includes a first case that is made of an aluminum alloy and accommodates the electric motor, and a second case that is made of an aluminum alloy and is coupled to the first case in an axial direction in a state of accommodating the nut and the screw shaft,
the electric motor is supported by the second case via a metal bracket, and
an entire surface of at least one of the second case and the metal bracket is covered with an insulating film.

2. The electric actuator according to claim 1, wherein a thickness of the insulating film is 5 μm or more.

3. The electric actuator according to claim 1, wherein
a rotating shaft of the electric motor and the screw shaft are disposed in parallel, and
the rotational motion of the electric motor is transmitted to the nut via a power transmission mechanism accommodated in the second case.

4. The electric actuator according to claim 1, wherein
a pair of guide grooves that extends in an axial direction is provided in an accommodating portion for the screw shaft in the second case,
a detent pin in which both end portions in a longitudinal direction are fitted into the pair of guide grooves is mounted on the screw shaft, and guide collars each having a bottomed cylindrical shape are rotatably mounted on the both end portions of the detent pin, and
cross-sectional shapes of a groove bottom surface of each of the pair of guide grooves and an outer bottom surface of each of the guide collars, the groove bottom surface and the outer bottom surface facing each other, are arc shapes.

* * * * *